(No Model.)
L. LUPPEN.
CULTIVATOR.
No. 261,863. Patented Aug. 1, 1882.
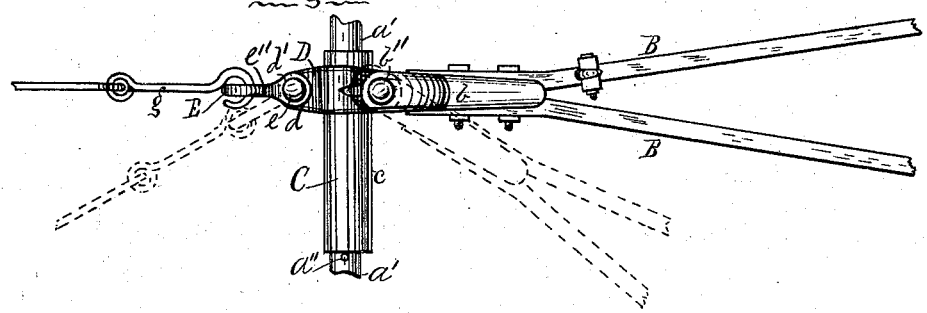
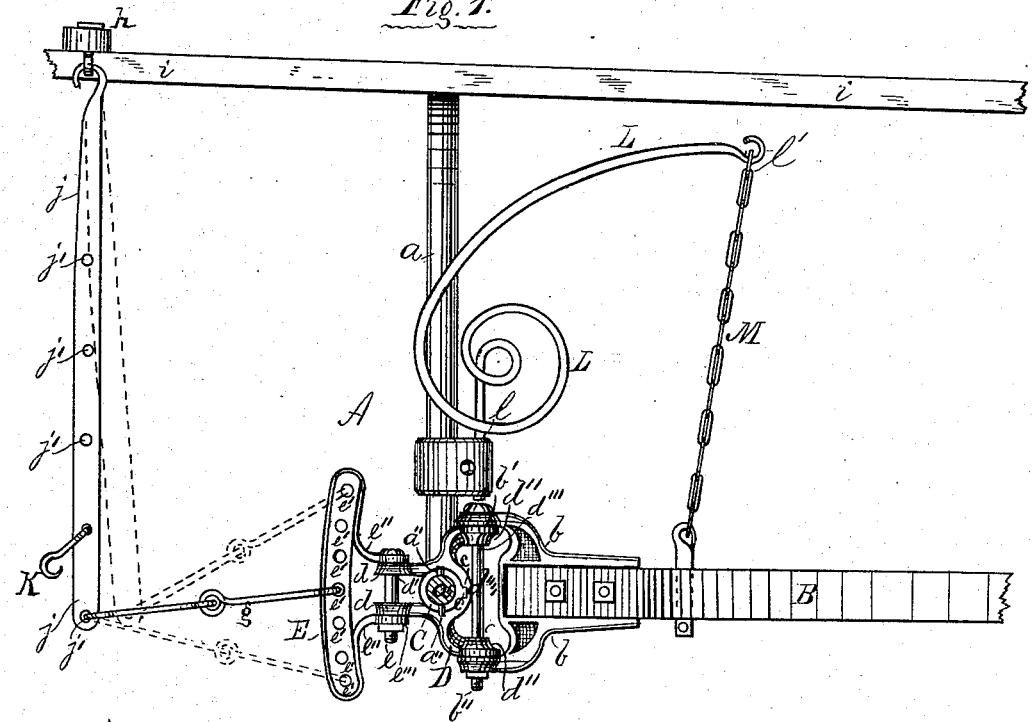
Witnesses.
P. R. Richards
John M. Thornton.
Inventor.
Luppe Luppen.
By W. B. Richards
Atty.

UNITED STATES PATENT OFFICE.

LUPPE LUPPEN, OF PEKIN, ILLINOIS.

CULTIVATOR.

SPECIFICATION forming part of Letters Patent No. 261,863, dated August 1, 1882.

Application filed March 29, 1882. (No model.)

To all whom it may concern:

Be it known that I, LUPPE LUPPEN, a citizen of the United States, residing at Pekin, in the county of Tazewell and State of Illinois, have invented certain new and useful Improvements in Cultivators; and I do hereby declare the following to be a full, clear, and exact description of the invention, such as will enable others skilled in the art to which it appertains to make and use the same.

My invention relates to improvements in cultivators of that class in which plow-beams are hinged to an axle, so as to permit swinging the plow-beams both laterally and vertically, whereby said plows or gangs may be used to cultivate both sides of a row of plants at the same time; and the invention consists in constructions and combinations hereinafter described, and set forth in the claims hereto annexed.

In the accompanying drawings, which illustrate my invention and form a part of this specification, Figure 1 is a side elevation of the coupling, the axle and spring, and adjacent parts of the cultivator. Fig. 2 is top plan of an end of the axle, the end of a plow-gang, its coupling to the axle, and the draft-clevis.

Referring to the drawings by letters, letter A represents one of the vertical sides $a$ and part of the horizontal end $a'$ of an ordinary centrally-elevated axle.

B is the end of a plow-beam or gang of plows.

C is a sleeve fitted loosely, so that it may turn on the end $a'$ of the axle, and is held from movement lengthwise on the axle by stud-pins $a''$. The sleeve C has a spline, $c$, lengthwise on its exterior surface.

D is a joint-piece, which partly encircles the sleeve C and has terminal jaws $d\ d$ projecting forward of said sleeve, each with a hole, $d'$, vertically through its outer end. Arms $d''$ project, the one upward and rearward and the other downward and rearward, from the rear side of the piece D, and have holes $d'''$ vertically through their outer ends. The piece D has a groove, $d''''$, which receives the spline $c$, whereby the joint-piece D and sleeve C will rotate on the axle together, and the joint-piece may be slid lengthwise on the sleeve to adjust it at different positions thereon for regulating the distance between the plow-beams. The joint-piece D is held, after adjustment, as last described, by a bolt, $e$, which passes through the jaws $d$.

E is a clevis with a vertical arm, having holes $e'$, from which jaws $e''$ extend rearward, and are provided with holes $e'''$, through which holes the bolt $e$ passes to secure the clevis to the joint-piece and permit the clevis to be flexed laterally on said bolt as an axis.

$b\ b$ are brackets projecting from the end of plow-beam B, as shown, and have holes $b'$ in their outer ends, through which a bolt, $b''$, passes to journal them to the arms $d''$, so that the plow-beams may be swung laterally on the bolt $b''$ as an axis.

The draft-animal may be attached directly to the clevis E by a hook-rod $g$; but I prefer attaching the hook-rod $g$ at its forward end to an ordinary draft-equalizing device, consisting of a double-tree, $h$, supported on tongue $i$, and having a pendant, $j$, at each end, with holes $j'$ in each pendant, from which the hook-rod $g$ extends to the clevis E, as shown at Fig. 1.

K is the single-tree hook, to which a draft-animal is attached.

The rotation of the sleeve C on the the axle permits the plow-beams to swing vertically, and all connections between the clevis E, joint-piece D, and plow-beams being rigid in so far as flexure in a vertical plane is regarded, it will be seen that by engaging the draft-hook $g$ in the lower series of holes in the clevis E the draft may be utilized in forcing the plows deeper into the ground, and by engaging it in the upper holes the plows may be made to run more shallow, as desired by the operator or required by the nature of the soil.

L is a spring coiled at one end, and its coiled end attached at $l$ to the side of the vertical part of the axle. The free end of the spring L extends rearward at some distance above the plow-beam, and has a hook, $l'$, thereon, from which a chain, M, extends downward to and is connected with the plow-beam, as shown. The free end of the spring is at such a distance from the plow-beam that the chain M may be of such length as to permit freely swinging the plow-beams laterally, while the tension of the spring and its arrangement are such as to only exert upward pull on the plow-beam sufficient to aid in swinging it laterally, as is so often required in operation, and not to aid particularly in raising the plows to suspend them above the ground.

When the draft is attached to the clevis E, so as to force the plow downwardly into the ground, the spring L will, by its yielding resistance thereto, improve the running or operation of the plows in the evident manner.

What I claim as new, and desire to secure by Letters Patent, is—

1. In a cultivator coupling-joint, in combination with the axle, plow-beam, and sleeve C, a joint-piece, D, having rearwardly-projecting arms, by which it is secured to the plow-beam, and forwardly-projecting arms $d$, by which it is secured to a clevis, E, having means of securing the draft-hooks thereto in higher and lower planes, substantially as and for the purpose specified.

2. In a cultivator coupling-joint, in combination with the axle, plow-beams, clevis E, and sleeve C, mounted on the axle, substantially as described, a joint-piece, D, which partially surrounds the sleeve C and is intermediate between the plow-beam and clevis, and connected to both by joints, which, while they permit lateral flexure, hold the parts rigid as regards vertical flexure, substantially as and for the purpose specified.

3. In combination with the axle, plow-beams, sleeve C, and joint-pieces D, having rearwardly-projecting arms, by which it is secured to the plow-beam, and forwardly-projecting arms $d$, by which it is secured to a clevis, E, constructed substantially as described, a spring connected at one end to the axle and at its other end to the plow-beam, and adapted to coact with the draft-clevis, substantially as and for the purpose specified.

In testimony whereof I affix my signature in presence of two witnesses.

LUPPE LUPPEN.

Witnesses:
C. A. KUHL,
W. R. MESICK, Jr.